United States Patent
Draznin et al.

(10) Patent No.: US 12,367,079 B2
(45) Date of Patent: Jul. 22, 2025

(54) MANAGEMENT AND ORCHESTRATION IN A HYBRID APPLICATIONS ENVIRONMENT

(71) Applicant: Microsoft Technology Licensing, LLC, Redmond, WA (US)

(72) Inventors: Sagiv Draznin, Walnut Creek, CA (US); Adam Scott Dorenter, Flemington, NJ (US); Donald Carl Hjort, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 847 days.

(21) Appl. No.: 17/566,443

(22) Filed: Dec. 30, 2021

(65) Prior Publication Data

US 2023/0214274 A1    Jul. 6, 2023

(51) Int. Cl.
*G06F 9/50* (2006.01)
*H04L 41/40* (2022.01)
(Continued)

(52) U.S. Cl.
CPC .......... *G06F 9/5077* (2013.01); *G06F 9/5055* (2013.01); *H04L 41/40* (2022.05); *H04L 41/50* (2013.01); *H04L 41/5054* (2013.01)

(58) Field of Classification Search
None
See application file for complete search history.

(56) References Cited

U.S. PATENT DOCUMENTS

| | | |
|---|---|---|
| 2019/0132211 A1 | 5/2019 | Yeung et al. |
| 2021/0132980 A1 | 5/2021 | Thakkar et al. |

(Continued)

FOREIGN PATENT DOCUMENTS

| | | |
|---|---|---|
| EP | 3901770 A1 | 10/2021 |
| WO | 2014058411 A1 | 4/2014 |
| WO | 2021245447 A1 | 12/2021 |

OTHER PUBLICATIONS

Hirai, et al., "Automated Provisioning of Cloud-Native Network Functions in Multi-Cloud Environments", In Proceedings of the 6th IEEE Conference on Network Softwarization, Jun. 29, 2020, pp. 359-361.

(Continued)

*Primary Examiner* — Qing Yuan Wu
(74) *Attorney, Agent, or Firm* — Ray Quinney & Nebeker P.C.; James S. Bullough

(57) ABSTRACT

A method for application orchestration and management in a hybrid applications environment that comprises both VNF applications and CNF applications can include receiving an application descriptor that describes features of a new application to be deployed. A determination can be made, based at least in part on the application descriptor, whether the new application should be deployed as a VNF application or as a CNF application. The new application can be deployed as a VNF application when the application descriptor indicates that the new application should be deployed as a VNF application and when the available VNF infrastructure is sufficient to deploy the new VNF application. Conversely, the new application can be deployed as a CNF application when the application descriptor indicates that the new application should be deployed as a CNF application and when the available CNF infrastructure is sufficient to deploy the new CNF application.

18 Claims, 8 Drawing Sheets

(51) Int. Cl.
*H04L 41/50*     (2022.01)
*H04L 41/5054*   (2022.01)

(56)             References Cited

U.S. PATENT DOCUMENTS

2021/0176112 A1    6/2021  Cherunni
2022/0035650 A1*   2/2022  Banerjee ............ H04L 12/4641

OTHER PUBLICATIONS

"International Search Report and Written Opinion Issued in PCT Application No. PCT/US22/044050", Mailed Date: Dec. 12, 2022, 12 Pages.

* cited by examiner

MANAGEMENT AND ORCHESTRATION IN A HYBRID APPLICATIONS ENVIRONMENT

BACKGROUND

Cloud computing is the delivery of computing services over the internet. Some examples of computing services that can be provided by a cloud computing system include storage, databases, networking, software, and analytics. The use of cloud computing technology has grown rapidly in recent years, due at least in part to the development of high-capacity networks as well as relatively low-cost computers and storage devices.

Broadly speaking, a cloud computing system includes two sections, a front end and a back end, that are in communication with one another via the internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet. A "hybrid cloud" architecture is the combination of public and private clouds by a wide area network or broadband connection.

There are many different types of services that cloud computing providers can offer to customers. One type of cloud computing service is referred to as Infrastructure as a Service (IaaS). IaaS is a form of cloud computing that delivers compute, network, and storage resources to consumers on-demand, over the Internet. IaaS enables end users to scale and shrink resources on an as-needed basis, reducing the need for large, up-front capital expenditures. This can be particularly beneficial for users who anticipate having variable workloads.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One or more implementations described herein relate to acts of a method, system, or computer-readable media for efficiently performing application orchestration and management in a hybrid applications environment that comprises both virtualized network functions (VNF) applications and cloud-native network functions (CNF) applications. For instance, a method may be performed by a unified management and orchestration system.

In one or more embodiments, a method includes receiving an application descriptor that describes features of an application. The method may further include determining, based at least in part on the application descriptor, whether the application should be deployed as a VNF application or as a CNF application. When the application descriptor indicates that the application should be deployed as the VNF application, the method may include determining whether available VNF infrastructure is sufficient to deploy the application as the VNF application, building additional VNF infrastructure when it is determined that the available VNF infrastructure is not sufficient to deploy the application as the VNF application, and instantiating the VNF application. When the application descriptor indicates that the application should be deployed as the CNF application, the method may include determining whether available CNF infrastructure is sufficient to deploy the application as the CNF application, building additional CNF infrastructure when it is determined that the available CNF infrastructure is not sufficient to deploy the application as the CNF application, and instantiating the CNF application.

In one or more embodiments, determining whether the application should be deployed as the VNF application or as the CNF application includes determining whether the application descriptor comprises a VNF descriptor (VNFD) or a Helm chart. In one or more embodiments, it is determined that the application should be deployed as the VNF application when the application descriptor comprises the VNFD. In one or more embodiments, it is determined that the application should be deployed as the CNF application when the application descriptor comprises the Helm chart.

In one or more embodiments, the unified management and orchestration system is part of a cloud computing system. In one or more embodiments, the cloud computing system includes cloud infrastructure. In one or more embodiments, determining whether the available VNF infrastructure is sufficient to deploy the application as the VNF application includes determining whether the cloud infrastructure comprises enough computing resources to deploy the application as the VNF application. In one or more embodiments, determining whether the available CNF infrastructure is sufficient to deploy the application as the CNF application includes determining whether the cloud infrastructure comprises enough computing resources to deploy the application as the CNF application In one or more embodiments, building the additional VNF infrastructure includes allocating additional computing resources to the VNF applications. In one or more embodiments, building the additional VNF infrastructure includes terminating at least one other lower priority VNF application.

One or more embodiments implementations described herein involve a method, system, or computer-readable media for efficiently performing application orchestration and management in a hybrid applications environment that comprises both virtualized network functions (VNF) applications and cloud-native network functions (CNF) applications. In one or more embodiments, the acts of the method (or system or computer-readable media) may be performed by a unified management and orchestration system.

For example, in one or more embodiments, a method includes allocating first computing resources for a first portion of a cloud infrastructure that includes VNF infrastructure. The method may also include causing a plurality of VNF applications to be deployed within the VNF infrastructure. The method may further include allocating second computing resources for a second portion of the cloud infrastructure that includes CNF infrastructure. The method may also include causing a plurality of CNF applications to be deployed within the CNF infrastructure. The method may also include receiving an application descriptor that describes features of a new application to be deployed. The method may also include instantiating a new VNF application when the application descriptor comprises at least one VNF characteristic indicating that the new application should be deployed as a VNF application and when the first computing resources are sufficient to deploy the plurality of VNF applications and the new VNF application. The method may also include instantiating a new CNF application when the application descriptor comprises at least one CNF characteristic indicating that the new application should be deployed as a CNF application and when the second computing resources are sufficient to deploy the plurality of CNF applications and the new CNF application.

In one or more embodiments, the method includes building additional VNF infrastructure when the application descriptor comprises the at least one VNF characteristic but the first computing resources are not sufficient to deploy the plurality of VNF applications and the new VNF application. In one or more embodiments, the method includes building additional CNF infrastructure when the application descriptor comprises the at least one CNF characteristic but the second computing resources are not sufficient to deploy the plurality of CNF applications and the new CNF application.

In one or more embodiments, the method may include terminating at least one lower priority VNF application when the application descriptor includes the at least one VNF characteristic but the first computing resources are not sufficient to deploy the plurality of VNF applications and the new VNF application. In one or more embodiments, the method may include terminating at least one lower priority CNF application when the application descriptor includes the at least one CNF characteristic but the second computing resources are not sufficient to deploy the plurality of CNF applications and the new CNF application.

In one or more embodiments, the at least one VNF characteristic comprises a VNF descriptor (VNFD). In one or more embodiments, the at least one CNF characteristic comprises a Helm chart.

One or more embodiments described herein relate to a system for efficiently performing application orchestration and management in a hybrid applications environment that includes both virtualized network functions (VNF) applications and cloud-native network functions (CNF) applications. In one or more embodiments, the system includes cloud infrastructure including a first portion corresponding to VNF infrastructure and a second portion corresponding to CNF infrastructure. The system may further include at least one processor, memory communicatively coupled to the at least one processor, and instructions stored in the memory being executable to perform acts described herein.

For example, in one or more embodiments, the instructions may be executable by the processor(s) to cause a plurality of VNF applications to be deployed within the VNF infrastructure, cause a plurality of CNF applications to be deployed within the CNF infrastructure, and receive an application descriptor that describes features of a new application to be deployed. The instructions may be further executable by the processor(s) to instantiate a new VNF application when the application descriptor comprises at least one VNF characteristic indicating that the new application should be deployed as a VNF application and when available VNF infrastructure is sufficient to deploy the new VNF application along with the plurality of VNF applications. The instructions may also be executable by the processor(s) to instantiate a new CNF application when the application descriptor comprises at least one CNF characteristic indicating that the new application should be deployed as a CNF application and when available CNF infrastructure is sufficient to deploy the new CNF application along with the plurality of CNF applications. The system may further include additional instructions being executable by the processor(s) to do any of the acts discussed here in connection with methods, systems, and computer-readable media.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
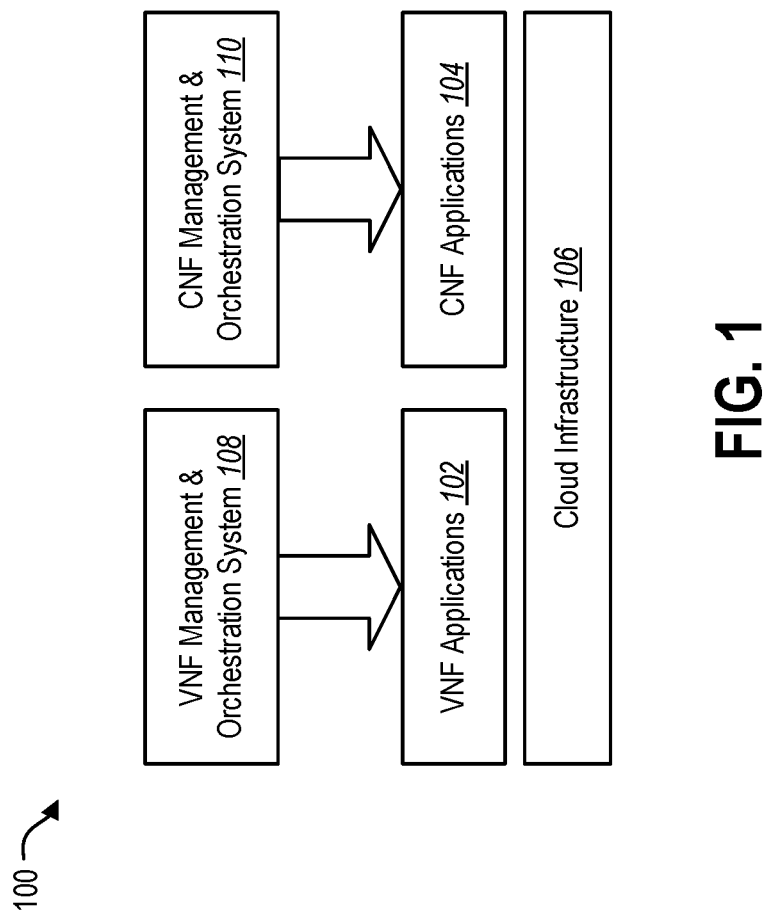
FIG. 1 illustrates an example of a cloud computing system that includes separate management and orchestration systems for deploying and managing VNF applications and CNF applications.

Network function virtualization (NFV) is a way to virtualize network services (e.g., firewalls, routers, load balancers) that have traditionally been run on proprietary hardware. With NFV, these network services can be deployed as virtual machines (VMs) on commodity, off-the-shelf hardware.

NFV architecture includes virtualized network functions (VNFs), which are software applications that provide the desired network services. VNFs are built on top of NFV infrastructure (NFVi). NFVi includes a virtual infrastructure manager (VIM) that allocates resources (e.g., processor(s), memory, storage, networking) efficiently among VNFs. The framework for managing NFVi and provisioning new VNFs is referred to as management, automation, and network orchestration (MANO).

VNFs have some significant limitations, especially as digital service providers move toward delivering more agile services. In the initial transition to VNFs, some service providers simply took embedded software systems from existing appliances and created one large VM. This had the effect of creating inefficient, single-purpose virtual appliances that are difficult to manage. It is difficult to achieve scalability in cloud environments with these types of legacy VNFs. Moreover, the large size of VMs can limit the efficiency of VNFs for certain types of deployments (e.g., large-scale 5G deployments, edge deployments) that need greater agility and scalability.

Like a VNF, a cloud-native network function (CNF) can be a software implementation of a network function that has traditionally been implemented on proprietary hardware. However, a CNF is built and deployed in a cloud-native way. The term "cloud native" describes an approach to building and running applications that exploits the benefits of the cloud computing model.

CNFs are designed and implemented to run inside containers. Containerization is an approach to software development in which an application and all of its dependencies (e.g., required executables, binaries, libraries, configuration files) are bundled into a single, isolated package. Containers abstract the operating system (OS), and multiple containers on a server share a common OS kernel. In addition to containers, CNFs can use orchestration services that automate service functionality. CNFs also enable the use of microservices, which are services that work together as a distributed system.

There are certain management and orchestration functions that are performed so that VNFs can be deployed. These functions may be referred to herein as VNF management and orchestration functions. Similarly, there are certain management and orchestration functions that are performed so that CNFs can be deployed. These functions may be referred to herein as CNF management and orchestration functions.

In current cloud computing systems, VNF management and orchestration functions are separated and isolated from CNF management and orchestration functions. This means that, with current approaches, cloud computing providers are required to have two separate management and orchestration systems: one management and orchestration system for deploying and managing VNF applications, and another management and orchestration system for deploying and managing CNF applications. The need to have two separate management and orchestration systems increases the complexity, cost, and overhead associated with operating a cloud computing system.

The present disclosure is generally related to a unified management and orchestration system that is capable of deploying and managing both VNF applications and CNF applications. Therefore, with the techniques disclosed herein, a single management and orchestration system can be used to deploy both types of applications.

FIG. 1 illustrates an example of a cloud computing system 100 that includes separate management and orchestration systems for deploying and managing VNF applications 102 and CNF applications 104.

The cloud computing system 100 includes cloud infrastructure 106. The cloud infrastructure 106 includes a plurality of computing devices (e.g., servers) equipped with hardware and software components. The hardware components include processors, memory, storage, network interfaces, and so forth. The software components include an operating system (OS), drivers for the various hardware components, and so forth.

The cloud computing system 100 includes a VNF management and orchestration system 108 that is configured to perform management and orchestration functions with respect to VNF applications 102. The cloud computing system 100 also includes a CNF management and orchestration system 110 that is configured to perform management and orchestration functions with respect to CNF applications 104.

Management functions include lifecycle management (e.g., instantiating, terminating, modifying, upgrading, scaling, healing), day zero configuration, resource management, release management, and so forth. Orchestration functions can include automating the tasks needed to manage connections and operations of workloads on private and public clouds. Cloud orchestration technologies can integrate automated tasks and processes into a workflow to perform specific operations.

Figure 2:
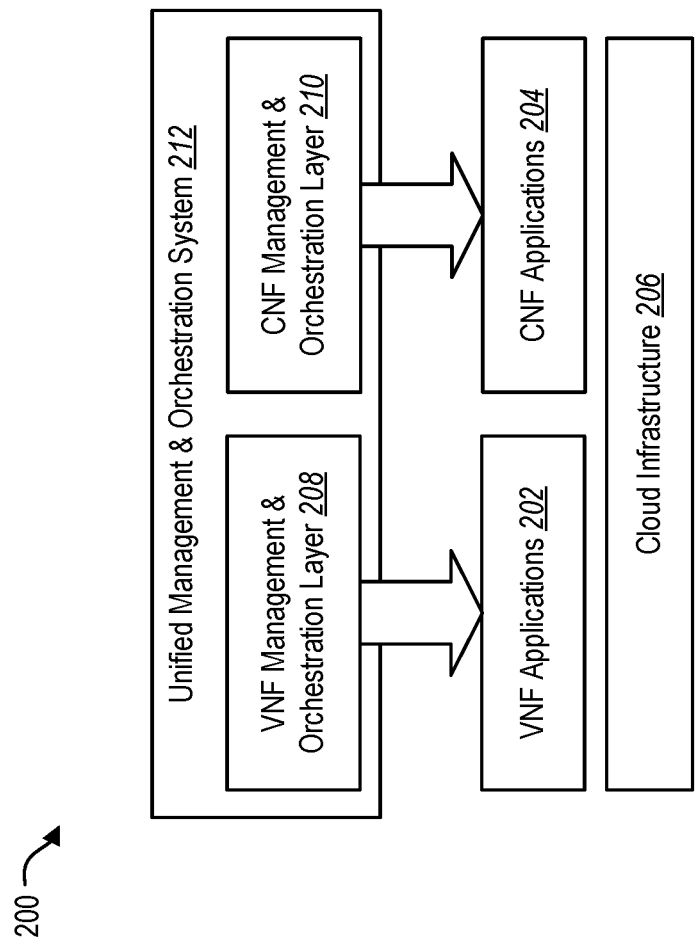
FIG. 2 illustrates an example of a cloud computing system that includes a unified management and orchestration system that can deploy VNF applications and CNF applications on the cloud infrastructure.

FIG. 2 illustrates an example of a cloud computing system 200 in which the techniques disclosed herein can be utilized.

The cloud computing system 200 includes a unified management and orchestration system 212 that can deploy VNF applications 202 and CNF applications 204 on the cloud infrastructure 206 (which can be similar to the cloud infrastructure 106 described previously). The unified management and orchestration system 212 includes a VNF management and orchestration layer 208 that is configured to perform management and orchestration functions with respect to VNF applications 202. The unified management and orchestration system 212 also includes a CNF management and orchestration layer 210 that is configured to perform management and orchestration functions with respect to CNF applications 204.

The cloud computing system 200 shown in FIG. 2 possesses several advantages compared to the cloud computing system 100 shown in FIG. 1. For example, the cloud computing system 200 shown in FIG. 2 enables VNF applications 202 and CNF applications 204 to be deployed more easily than the cloud computing system 100 shown in FIG. 1.

In order to deploy a VNF application 102 in the cloud computing system 100 shown in FIG. 1, it is necessary to know how to use the VNF management and orchestration system 108. Similarly, in order to deploy a CNF application 104 in the cloud computing system 100 shown in FIG. 1, it is necessary to know how to use the CNF management and orchestration system 110.

As discussed herein, the nature of VNF applications 202 and CNF applications 204 are different. For example, CNF applications 204 typically use containers rather than VMs. Containers allow clients to package software (e.g., applications, functions, microservices) with each of multiple files that are needed to run the CNF applications 204 while also sharing access to the operating system and other server resources. This containerization of CNF applications 204 enables easier movement of the container component(s) among environments (e.g., development, test, production) and even between cloud computing platforms while retaining full functionality. Provisioning CNF applications 204 versus VNF applications 202 also involve different understandings of the infrastructure as VMs of VNF applications 202 use an abstraction layer of hardware while CNF applications 204 use the abstraction of the operating systems. These principles of operation thus create different resource needs when provisioning the respective application types.

However, with the cloud computing system 200 shown in FIG. 2, it is not necessary to know any of the specific details of the VNF management and orchestration layer 208 or the CNF management and orchestration layer 210 in order to deploy VNF applications 202 and CNF applications 204. Instead, someone who wants to deploy an application on the cloud computing system 200 can simply provide a description of the application to the unified management and orchestration system 212. The unified management and orchestration system 212 can then determine, based on the description that is provided, which type of application (either a VNF application 202 or a CNF application 204) should be deployed. In addition, the unified management and orchestration system 212 can utilize the appropriate management and orchestration layer (either the VNF management and orchestration layer 208 or the CNF management and orchestration layer 210) to deploy the appropriate type of application.

In some embodiments, a cloud computing provider can make the unified management and orchestration system 212 available to its users/customers. A user/customer can utilize the unified management and orchestration system 212 in connection with deploying one or more applications in the cloud computing system 200.

Figure 3:
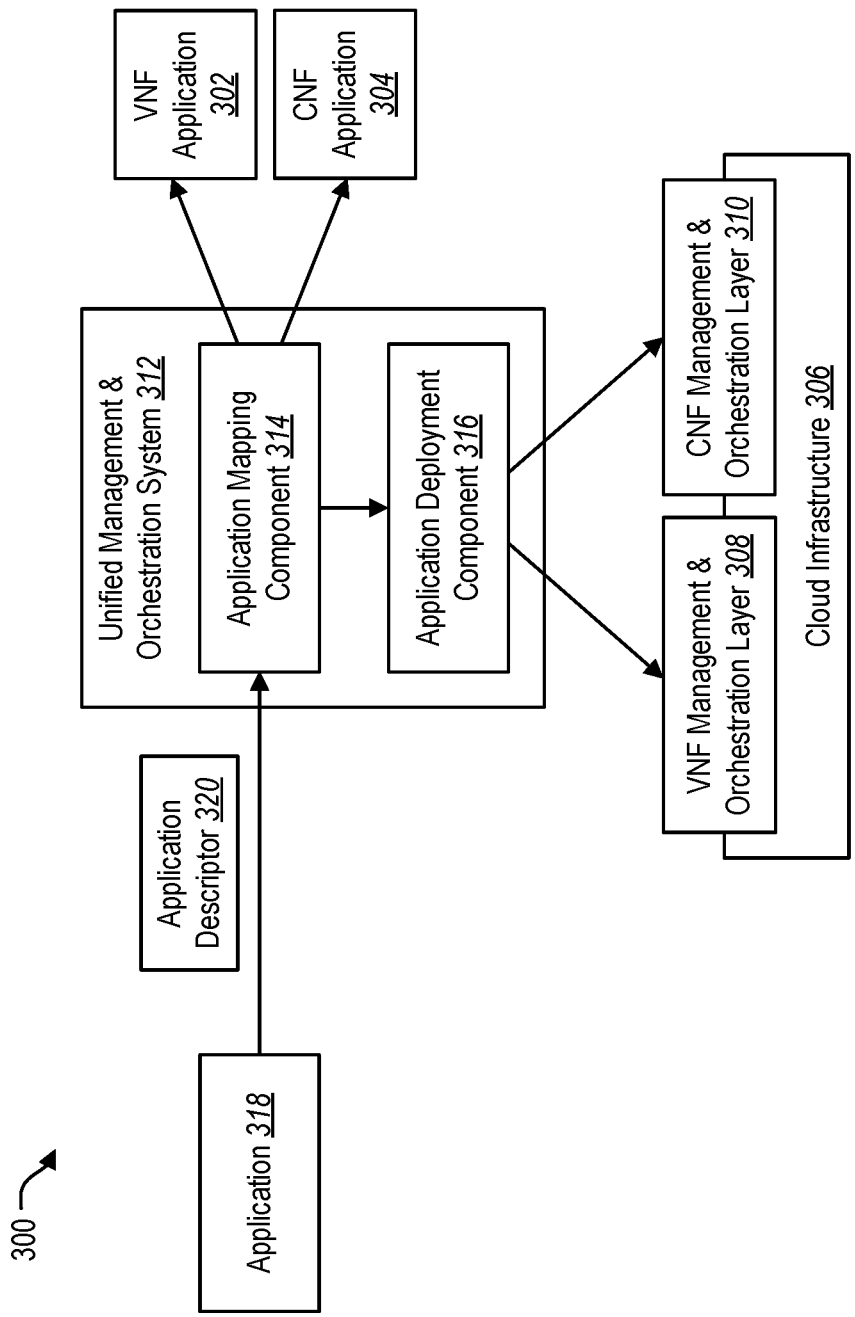
FIG. 3 illustrates another example of a cloud computing system that includes a unified management and orchestration system.

FIG. 3 illustrates another example of a cloud computing system 300 that includes a unified management and orchestration system 312. In the depicted embodiment, the unified management and orchestration system 312 includes an application mapping component 314 and an application deployment component 316.

FIG. 3 shows an application descriptor 320 corresponding to an application 318 being provided to the application mapping component 314 within the unified management and orchestration system 312. The application descriptor 320 describes one or more features and/or characteristics of the application 318. The application mapping component 314 is configured to evaluate the application descriptor 320 and determine, based at least in part on the application descriptor 320, whether the application 318 should be deployed as a VNF application 302 or as a CNF application 304.

In some embodiments, the application descriptor 320 can be either a VNF descriptor (VNFD) or a Helm chart. Considering these particular application descriptors 320 enables the unified management and orchestration system 312 to detect ahead of time whether an application to be deployed is a VNF application 302 or a CNF application 304.

A VNFD is an application descriptor 320 for VNF applications 302. More specifically, a VNFD is a deployment template that describes a VNF in terms of deployment and operational behavior requirements. A VNFD can also include connectivity, interface, and virtualized resource requirements. A Helm chart is an application descriptor 320 for CNF applications 304. Helm is a package manager for the Kubernetes container-orchestration system. Helm charts are used for defining, installing, and upgrading Kubernetes applications. In some implementations, Helm charts are Kubernetes YAML ("yet another markup language") manifests combined into a single package that can be advertised to Kubernetes clusters.

In some embodiments, determining whether the application 318 should be deployed as a VNF application 302 or a CNF application 304 can include determining whether the application descriptor 320 is a VNFD or a Helm chart. If the application descriptor 320 is a VNFD, then the application mapping component 314 can determine that the application 318 should be deployed as a VNF application 302. On the other hand, if the application descriptor 320 is a Helm chart, then the application mapping component 314 can determine that the application 318 should be deployed as a CNF application 304.

In some embodiments, the application descriptor 320 can include one or more characteristics indicating whether the application 318 should be deployed as a VNF application 302 or a CNF application 304. If the application mapping component 314 identifies one or more characteristics indicating that the application 318 should be deployed as a VNF application 302, then the application mapping component 314 can decide to deploy the application 318 as a VNF application 302. Conversely, if the application mapping component 314 identifies one or more characteristics indicating that the application 318 should be deployed as a CNF application 304, then the application mapping component 314 can decide to deploy the application 318 as a CNF application 304.

Once a decision has been made about whether the application 318 should be deployed as a VNF application 302 or a CNF application 304, the application mapping component 314 can pass information to the application deployment component 316 about the type of application (VNF application 302 or CNF application 304) that should be deployed. The application deployment component 316 can then cause the appropriate type of application to be deployed. In particular, if it has been determined that the application 318 should be deployed as a VNF application 302, then the application deployment component 316 can communicate with the VNF management and orchestration layer 308 to deploy the VNF application 302 within the cloud infrastructure 306. On the other hand, if it has been determined that the application 318 should be deployed as a CNF application 304, then the application deployment component 316 can communicate with the CNF management and orchestration layer 310 to deploy the CNF application 304 within the cloud infrastructure 306.

Although FIG. 3 shows the unified management and orchestration system 312 with an application mapping component 314 and an application deployment component 316, these components are provided for purposes of example only and should not be interpreted as limiting the scope of the present disclosure. In some embodiments, the functions that were described above in connection with the application mapping component 314 and the application deployment component 316 can be combined into a single component. In other embodiments, these functions can be distributed across more than two components.

Figure 4:
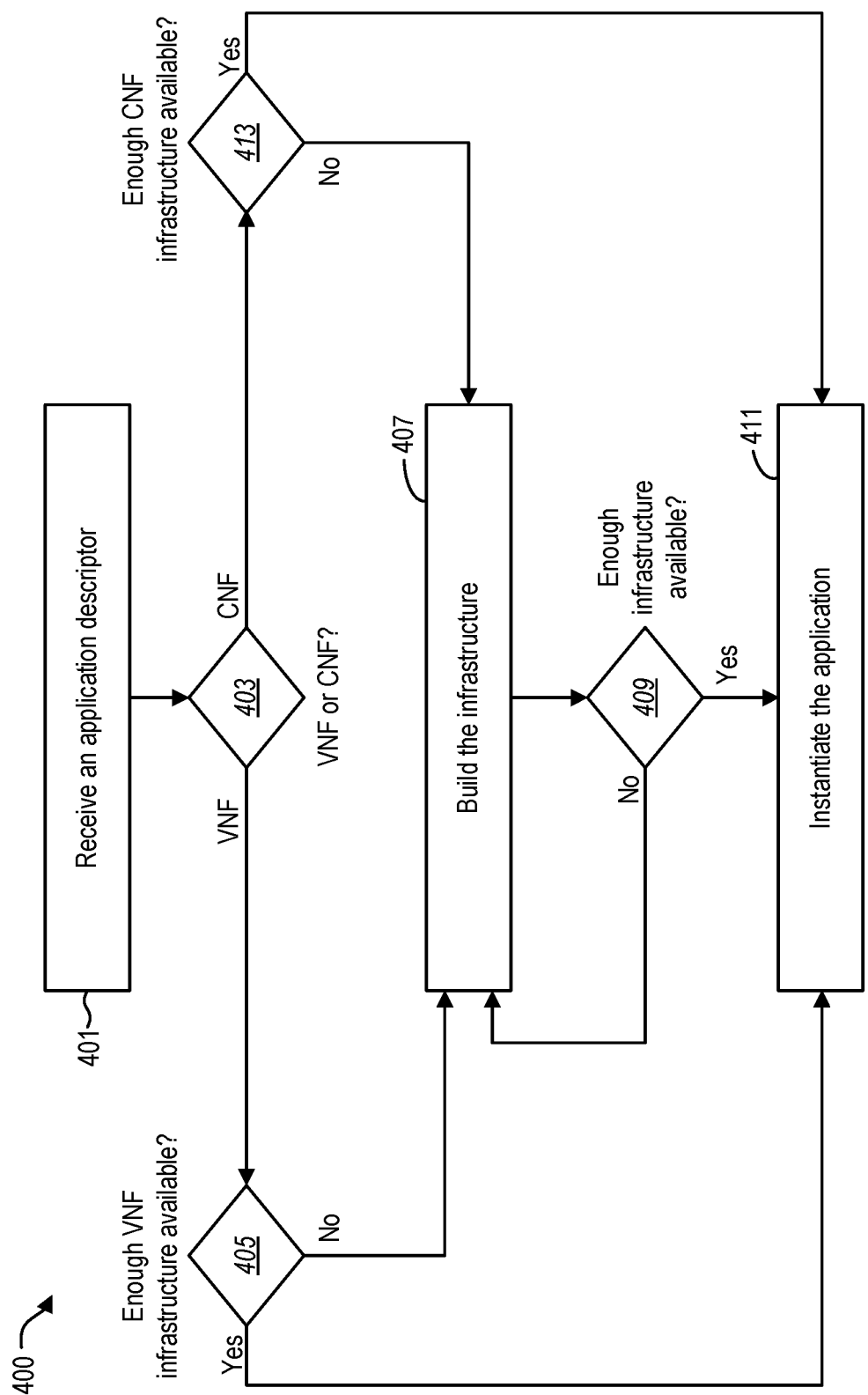
FIG. 4 illustrates an example of a method that can be performed by a unified management and orchestration system in accordance with the present disclosure.

FIG. 4 illustrates an example of a method 400 that can be performed by a unified management and orchestration system 312 in accordance with the present disclosure. The method 400 will be described in relation to the cloud computing system 300 shown in FIG. 3.

At 401, the unified management and orchestration system 312 can receive an application descriptor 320. More specifically, an application mapping component 314 within the unified management and orchestration system 312 can receive an application descriptor 320. As noted above, the application descriptor 320 describes one or more features and/or characteristics of the application 318. In some embodiments, the application descriptor 320 can be a VNFD or a Helm chart.

In some embodiments, a user/customer of a cloud computing system 300 can provide an application descriptor 320 to the unified management and orchestration system 312 as part of the deployment of an application 318 within the cloud computing system 300. The application descriptor 320 can be provided to the unified management and orchestration system 312 via a user interface of the unified management and orchestration system 312.

At 403, the application mapping component 314 can evaluate the application descriptor 320 and determine, based at least in part on the application descriptor 320, whether the application 318 should be deployed as a VNF application 302 or a CNF application 304.

As discussed above, in some embodiments, determining whether the application 318 should be deployed as a VNF application 302 or a CNF application 304 can include determining whether the application descriptor 320 is a VNFD or a Helm chart. If the application descriptor 320 is a VNFD, then the application mapping component 314 can determine that the application 318 should be deployed as a VNF application 302. On the other hand, if the application descriptor 320 is a Helm chart, then the application mapping component 314 can determine that the application 318 should be deployed as a CNF application 304.

If at 403 it is determined that the application 318 should be deployed as a VNF application 302, then the method 400 can proceed to 405. At 405, the application deployment component 316 can determine whether the amount of available VNF infrastructure is sufficient to deploy the application 318 as a VNF application 302.

In some embodiments, determining whether the amount of available VNF infrastructure is sufficient to deploy the application 318 as a VNF application 302 can include determining whether the cloud infrastructure 306 within the cloud computing system 300 includes enough available computing resources (e.g., processors, memory, storage, networking) to deploy the application 318 as a VNF application 302.

It is noted that in considering different infrastructure demands of VNF v. CNF applications, the way in which containers are structured can be different than virtual functions. For example, while CNF and VNF applications may have similar hardware requirements, CNF applications 304 can place physical and virtual network functions inside containers. This can provide many of the VNF-related advantages discussed herein without requiring availability to specific infrastructure, such as a guest operating system or hypervisor. This enables the CNF applications 304 to spin up or down as needed.

If at 405 it is determined that there is enough VNF infrastructure available to deploy the application 318 as a VNF application 302, then the method 400 can proceed directly to 411 and the application deployment component 316 can instantiate the VNF application 302.

On the other hand, if at 405 it is determined that there is not enough VNF infrastructure available to deploy the application 318 as a VNF application 302, then the method 400 can proceed to 407. At 407, the application deployment component 316 can build the VNF infrastructure that is needed to deploy the application 318 as a VNF application 302. As an example, building the VNF infrastructure that is needed to deploy the application 318 as a VNF application 302 can include allocating additional computing resources to VNFs. As another example, building the VNF infrastructure that is needed to deploy the application 318 as a VNF application 302 can include terminating at least one other lower priority VNF application. Then the method 400 can proceed to 409.

At 409, the application deployment component 316 can once again determine whether the amount of available VNF infrastructure is sufficient to deploy the application 318 as a VNF application 302. If it is, then at 411 the application deployment component 316 can instantiate the VNF application 302.

If at 409 it is determined that the amount of available VNF infrastructure is not sufficient to deploy the application 318 as a VNF application 302, then the method 400 can return to 407. At 407, the application deployment component 316 can build the VNF infrastructure that is needed to deploy the application 318 as a VNF application 302. As noted above, building the VNF infrastructure that is needed to deploy the application 318 as a VNF application 302 can include allocating additional computing resources to VNFs and/or terminating at least one other lower priority VNF application. Then the method 400 can return to 409 and proceed as described above.

If at 403 it is determined that the application 318 should be deployed as a CNF application 304, then the method 400 can proceed to 413. At 413, the application deployment component 316 can determine whether the amount of available CNF infrastructure is sufficient to deploy the application 318 as a CNF application 304. As noted above, with CNF and VNF applications running on different software stacks, a CNF function may refer to a network function designed and implemented to run inside containers. In one or more embodiments, CNFs inherit all cloud native architectural and operational principles, such as container lifecycle management, agility, resilience, and observability. In some embodiments, determining whether the amount of available CNF infrastructure is sufficient to deploy the application 318 as a CNF application 304 can include determining whether the cloud infrastructure 306 within the cloud computing system 300 includes enough computing resources (e.g., processors, memory, storage, networking) to deploy the application 318 as a CNF application 304.

If at 413 it is determined that there is enough CNF infrastructure available to deploy the application 318 as a CNF application 304, then the method 400 can proceed directly to 411 and the application deployment component 316 can instantiate the CNF application 304.

On the other hand, if at 413 it is determined that there is not enough CNF infrastructure available to deploy the application 318 as a CNF application 304, then the method 400 can proceed to 407. At 407, the application deployment component 316 can build the CNF infrastructure that is needed to deploy the application 318 as a CNF application 304. As an example, building the CNF infrastructure that is needed to deploy the application 318 as a CNF application 304 can include allocating additional computing resources to CNFs. As another example, building the CNF infrastructure that is needed to deploy the application 318 as a CNF application 304 can include terminating at least one other lower priority CNF application. Then the method 400 can proceed to 409.

At 409, the application deployment component 316 can once again determine whether the amount of available CNF infrastructure is sufficient to deploy the application 318 as a CNF application 304. If it is, then at 411 the application deployment component 316 can instantiate the CNF application 304.

If at 409 it is determined that the amount of available CNF infrastructure is not sufficient to deploy the application 318 as a CNF application 304, then the method 400 can return to 407. At 407, the application deployment component 316 can build the CNF infrastructure that is needed to deploy the application 318 as a CNF application 304. As noted above, building the CNF infrastructure that is needed to deploy the application 318 as a CNF application 304 can include allocating additional computing resources to CNFs and/or terminating at least one other lower priority CNF application. Then the method 400 can return to 409 and proceed as described above.

Figure 5A:
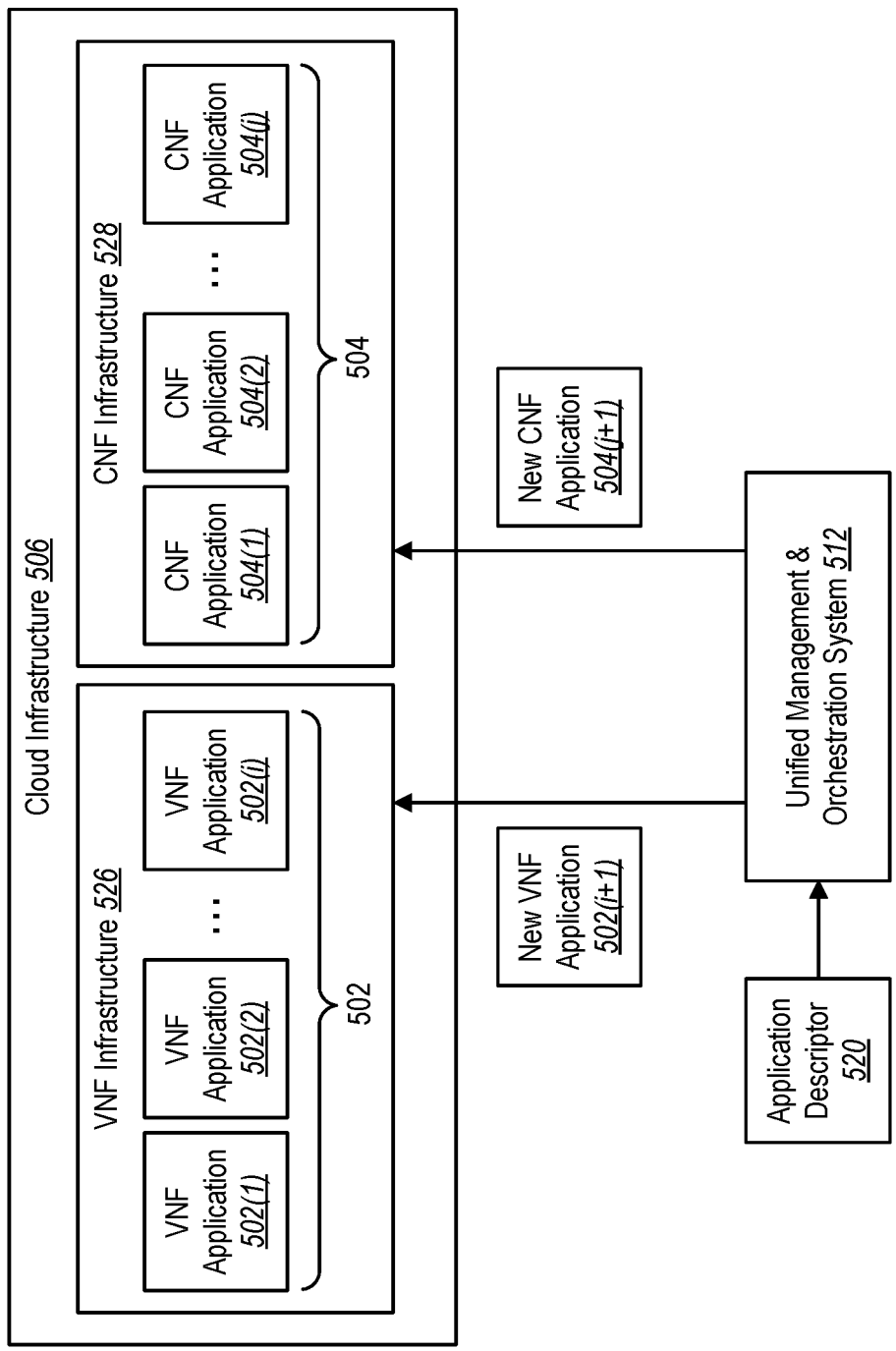
FIGS. 5A-C illustrate an example showing various aspects related to the deployment of VNF applications and CNF applications in a cloud computing system.
Figure 5B:
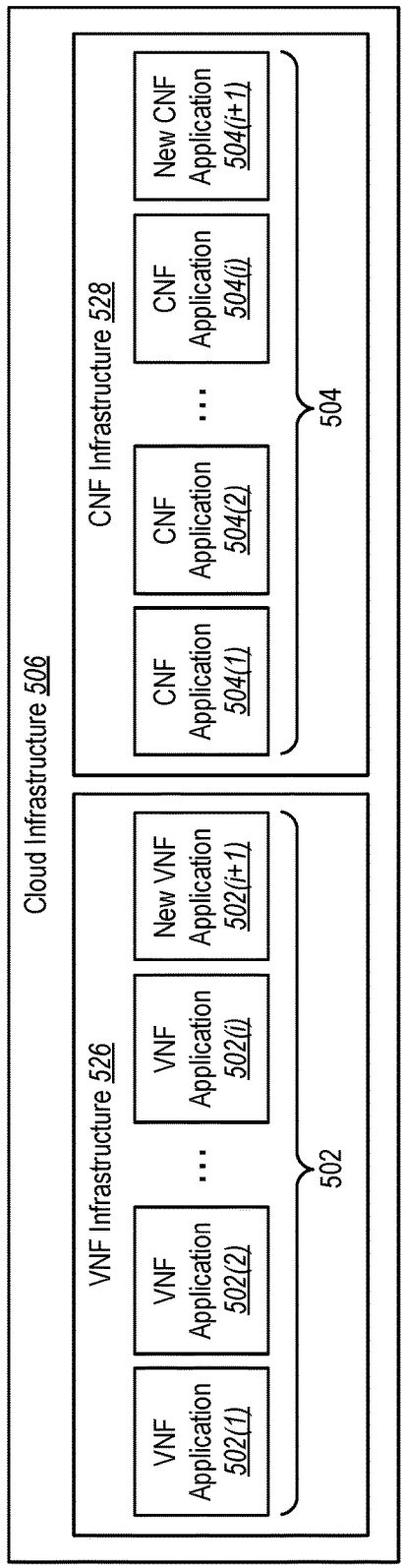
Figure 5C:
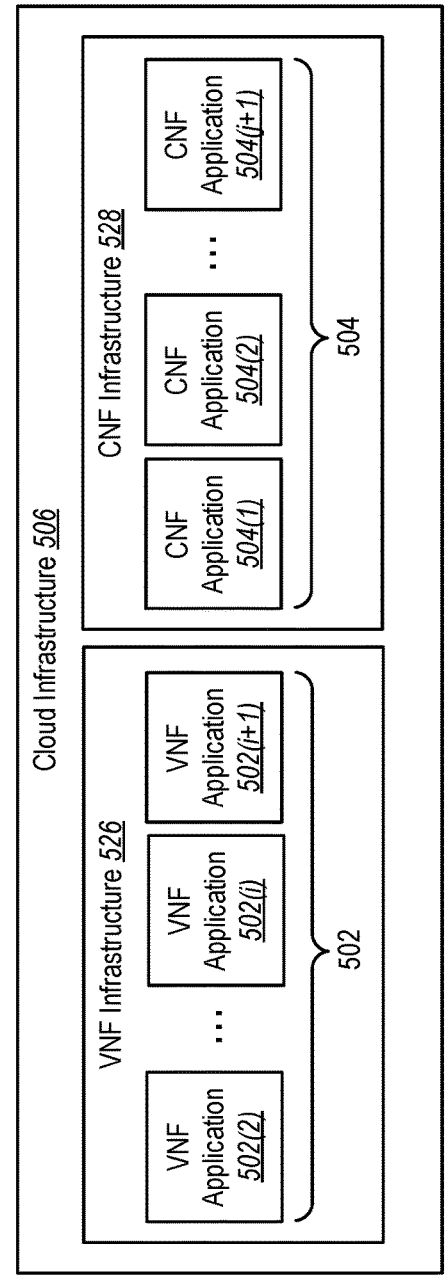

FIGS. 5A-C illustrate an example showing various aspects related to the deployment of VNF applications 502 and CNF applications 504 in a cloud computing system 500.

Reference is initially made to FIG. 5A. In the depicted example, a first portion of the cloud infrastructure 506 is allocated to VNF applications 502 and a second portion of the cloud infrastructure 506 is allocated to CNF applications 504. The portion of the cloud infrastructure 506 that is allocated to VNF applications 502 may be referred to herein as VNF infrastructure 526, while the portion of the cloud infrastructure 506 that is allocated to CNF applications 504 may be referred to herein as CNF infrastructure 528.

The VNF infrastructure 526 is shown with i VNF applications 502 and the CNF infrastructure 528 is shown with j CNF applications 504. More specifically, the VNF infrastructure 526 is shown with a first VNF application 502(1), a second VNF application 502(2), and an $i^{th}$ VNF application 502($i$). The CNF infrastructure 528 is shown with a first CNF application 504(1), a second CNF application 504(2), and a $j^{th}$ CNF application 504($j$). The values of i and j can be any positive integer that is greater than or equal to one. In some embodiments, the values of i and j can be different from one another. In other embodiments, the values of i and j can be equal to one another.

For purposes of example, suppose that a unified management and orchestration system 512 within the cloud computing system 500 determines that a new VNF application 502($i$+1) should be deployed. This decision can be made in response to receiving an application descriptor 520 that describes one or more features of the new VNF application 502($i$+1). Further suppose that, at the time when the unified management and orchestration system 512 determines that the new VNF application 502($i$+1) should be deployed, the VNF applications 502(1), 502(2), . . . 502($i$) that are currently deployed are utilizing all of the computing resources that have been allocated to the VNF infrastructure 526.

In this situation, one possible action that can be taken by the unified management and orchestration system 512 involves allocating additional computing resources to the VNF infrastructure 526. The results of allocating additional computing resources to the VNF infrastructure 526 are shown in FIG. 5B. In particular, FIG. 5B shows the VNF infrastructure 526 after sufficient computing resources have been allocated to the VNF infrastructure 526 so that all of the previously deployed VNF applications 502 (e.g., VNF application 502(1), VNF application 502(2), . . . , VNF application 502($i$)) can still run within the VNF infrastructure 526 along with the new VNF application 502($i$+1).

Another possible action that can be taken by the unified management and orchestration system 512 in the situation described above is to terminate at least one other lower priority VNF application 502. For example, suppose that the new VNF application 502($i$+1) has a higher priority than the VNF application 502(1). In this case, the unified management and orchestration system 512 can terminate the VNF application 502(1) in order to free up enough computing resources so that the new VNF application 502($i$+1) can be deployed. This result is shown in FIG. 5C. In particular, FIG. 5C shows the VNF infrastructure 526 after the VNF application 502(1) has been terminated and the new VNF application 502($i$+1) has been deployed.

The above discussion focused on the VNF applications 502, but similar actions can be taken in connection with the CNF applications 504. For example, referring once again to FIG. 5A, suppose that the unified management and orchestration system 512 determines that a new CNF application 504($j$+1) should be deployed. This decision can be made in response to receiving an application descriptor 520 that describes features of the new CNF application 504($j$+1). Further suppose that, at the time when the unified management and orchestration system 512 determines that the new CNF application 502($j$+1) should be deployed, the CNF applications 504(1), 504(2), . . . 504($j$) that are currently deployed are utilizing all of the computing resources that have been allocated to the CNF infrastructure 528.

In this situation, one possible action that can be taken by the unified management and orchestration system 512 involves allocating additional computing resources to the CNF infrastructure 528. The results of allocating additional computing resources to the CNF infrastructure 528 are shown in FIG. 5B. In particular, FIG. 5B shows the CNF infrastructure 528 after sufficient computing resources have been allocated to the CNF infrastructure 528 so that all of the previously deployed CNF applications 504 (e.g., CNF application 504(1), CNF application 504(2), . . . , CNF application 504( )) can still run within the CNF infrastructure 528 along with the new CNF application 504($j$+1).

Another possible action that can be taken by the unified management and orchestration system 512 in the situation described above is to terminate at least one other lower priority CNF application 504. For example, suppose that the new CNF application 504($j$+1) has a higher priority than the CNF application 504($h$. In this case, the unified management and orchestration system 512 can terminate the CNF application 504($j$) in order to free up enough computing resources so that the new CNF application 504($j$+1) can be deployed. This result is shown in FIG. 5C. In particular, FIG. 5C shows the CNF infrastructure 528 after the CNF application 504($j$) has been terminated and the new CNF application 504($j$+1) has been deployed.

Figure 6:
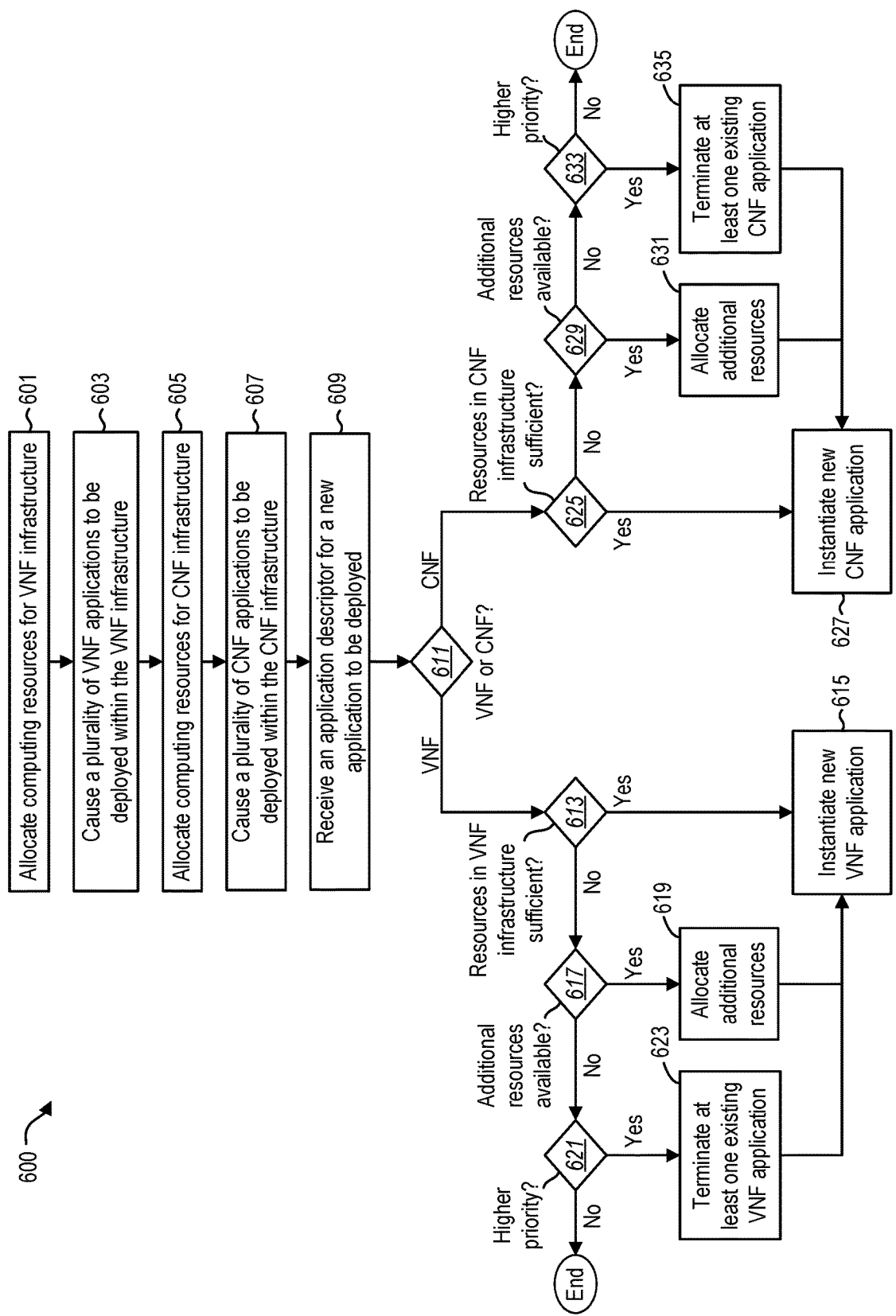
FIG. 6 illustrates another example of a method that can be performed by a unified management and orchestration system in accordance with the present disclosure.

FIG. 6 illustrates an example of a method 600 that can be performed by a unified management and orchestration system 512 in accordance with the present disclosure. The method 600 will be described in relation to the cloud computing system 500 shown in FIGS. 5A-C.

At 601, the unified management and orchestration system 512 can allocate computing resources for VNF infrastructure 526. At 603, the unified management and orchestration system 512 can cause a plurality of VNF applications 502

(e.g., VNF application 502(1), VNF application 502(2), ... VNF application 502(i)) to be deployed within the VNF infrastructure 526.

At 605, the unified management and orchestration system 512 can allocate computing resources for CNF infrastructure 528. At 607, the unified management and orchestration system 512 can cause a plurality of CNF applications 504 (e.g., CNF application 504(1), CNF application 504(2), ... CNF application 504(j) to be deployed within the CNF infrastructure 528.

At 609, the unified management and orchestration system 512 can receive an application descriptor 520. The application descriptor 520 describes features of a new application that is to be deployed. As noted above, in some embodiments, the application descriptor 520 can be a VNFD or a Helm chart.

At 611, the unified management and orchestration system 512 can evaluate the application descriptor 520 and determine, based at least in part on the application descriptor 520, whether the new application should be deployed as a VNF application or a CNF application.

As discussed above, in some embodiments, determining whether the new application should be deployed as a VNF application or a CNF application can include determining whether the application descriptor 520 is a VNFD or a Helm chart. If the application descriptor 520 is a VNFD, then the unified management and orchestration system 512 can determine that the new application should be deployed as a VNF application. On the other hand, if the application descriptor 520 is a Helm chart, then the unified management and orchestration system 512 can determine that the new application should be deployed as a CNF application.

If at 611 it is determined that the new application should be deployed as a VNF application, then the method 600 can proceed to 613. At 613, the unified management and orchestration system 512 can determine whether the computing resources that are currently allocated to the VNF infrastructure 526 are sufficient to deploy a new VNF application 502(i+1) in addition to the currently running VNF applications 502(1), 502(2), ... 502(i). If they are, then at 615 the unified management and orchestration system 512 can cause a new VNF application 502(i+1) to be instantiated.

On the other hand, if the unified management and orchestration system 512 determines that the computing resources that are currently allocated to the VNF infrastructure 526 are not sufficient to deploy a new VNF application 502(i+1) in addition to the currently running VNF applications 502(1), 502(2), ... 502(i), then the method 600 can proceed to 617. At 617, the unified management and orchestration system 512 can determine whether there are additional computing resources available to allocate to the VNF infrastructure 526. If there are, then at 619 the unified management and orchestration system 512 can cause additional resources to be allocated to the VNF infrastructure 526. Then the method 600 can proceed to 615, and the unified management and orchestration system 512 can cause a new VNF application 502(i+1) to be instantiated.

However, if at 617 the unified management and orchestration system 512 determines that there are not any additional computing resources available to allocate to the VNF infrastructure 526, then the method can proceed to 621. At 621, the unified management and orchestration system 512 can determine whether the new VNF application 502(i+1) is higher priority than any of the VNF applications 502(1), 502(2), ... 502(i) that are currently running in the VNF infrastructure 526. If not, then the method 600 can end without instantiating the new VNF application 502(i+1).

However, if the new VNF application 502(i+1) is higher priority than at least one of the VNF applications 502(1), 502(2), ... 502(i) that are currently running in the VNF infrastructure 526, then at 623 the unified management and orchestration system 512 can terminate at least one of the VNF applications 502(1), 502(2), ... 502(i) in order to free up computing resources for the new VNF application 502(i+1). Then the method 600 can proceed to 615, and the unified management and orchestration system 512 can cause the new VNF application 502(i+1) to be instantiated.

If at 611 it is determined that the new application should be deployed as a CNF application, then the method 600 can proceed to 625. At 625, the unified management and orchestration system 512 can determine whether the computing resources that are currently allocated to the CNF infrastructure 528 are sufficient to deploy a new CNF application 504(j+1) in addition to the currently running CNF applications 504(1), 504(2), ... 504(j). If they are, then at 627 the unified management and orchestration system 512 can cause a new CNF application 504(j+1) to be instantiated.

On the other hand, if the unified management and orchestration system 512 determines that the computing resources that are currently allocated to the CNF infrastructure 528 are not sufficient to deploy a new CNF application 504(j+1) in addition to the currently running CNF applications 504(1), 504(2), ... 50401 then the method 600 can proceed to 629. At 629, the unified management and orchestration system 512 can determine whether there are additional computing resources available to allocate to the CNF infrastructure 528. If there are, then at 631 the unified management and orchestration system 512 can cause additional resources to be allocated to the CNF infrastructure 528. Then the method 600 can proceed to 627, and the unified management and orchestration system 512 can cause a new CNF application 504(i+1) to be instantiated.

However, if at 629 the unified management and orchestration system 512 determines that there are not any additional computing resources available to allocate to the CNF infrastructure 528, then the method can proceed to 633. At 633, the unified management and orchestration system 512 can determine whether the new CNF application 504(j+1) is higher priority than any of the CNF applications 504(1), 504(2), ... 504(j) that are currently running in the CNF infrastructure 528. If not, then the method 600 can end without instantiating the new CNF application 504(j+1). However, if the new CNF application 504(j+1) is higher priority than at least one of the CNF applications 504(1), 504(2), ... 504(j) that are currently running in the CNF infrastructure 528, then at 635 the unified management and orchestration system 512 can terminate at least one of the CNF applications 504(1), 504(2), ... 504(j) in order to free up computing resources for the new CNF application 504 (j+1). Then the method 600 can proceed to 627, and the unified management and orchestration system 512 can cause the new CNF application 504(j+1) to be instantiated.

In some embodiments, one or more features of a unified management and orchestration system as disclosed herein can be implemented using one or more plugins. The plugins can be configured to meet interface, service model, and workflow requirements. As one example, a unified management and orchestration system can include a plugin for performing management, automation, and network orchestration (MANO) functions. As another example, a unified management and orchestration system can include a plugin for performing network slice management functions. The plugins can be configured to be end-user extensible.

Figure 7:
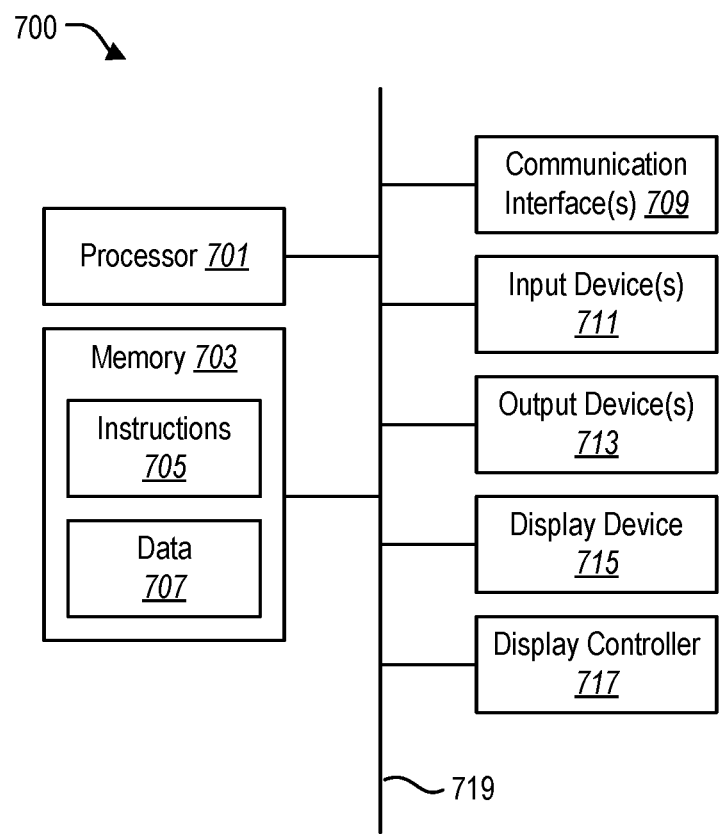
FIG. 7 illustrates certain components that can be included within a computing system that can be used to implement the actions and operations described herein.

FIG. 7 illustrates certain components that can be included within a computing system 700 that can be used to implement the actions and operations described herein. In some embodiments, a plurality of computing systems 700 can collectively implement the actions and operations described herein.

The computing system 700 includes a processor 701 and memory 703 in electronic communication with the processor 701. Instructions 705a and data 707a can be stored in the memory 703. The instructions 705a can be executable by the processor 701 to implement some or all of the methods, steps, operations, actions, or other functionality disclosed herein. Executing the instructions 705a can involve the use of the data 707a that is stored in the memory 703. When the processor 701 executes the instructions 705a, various instructions 705b can be loaded onto the processor 701, and various pieces of data 707b can be loaded onto the processor 701.

Unless otherwise specified, any of the various examples of modules and components described herein can be implemented, partially or wholly, as instructions 705a stored in memory 703 and executed by the processor 701. Any of the various examples of data described herein can be among the data 707a that is stored in memory 703 and used during execution of the instructions 705a by the processor 701.

Although just a single processor 701 and a single memory 703 are shown in the computing system 700 of FIG. 7, in an alternative configuration, a combination of processors and/or a combination of memory devices could be used.

The instructions 705a in the memory 703 can be executable by the processor 701 to perform some or all aspects of the methods that have been described herein. The data 707a stored in the memory 703 can include any of the various examples of data described herein, including any data that is stored, accessed, or otherwise used in connection with the methods that have been described herein.

The computing system 700 can also include various other components, including one or more communication interfaces 709, one or more input devices 711, and one or more output devices 713.

The communication interface(s) 709 can be configured to communicate with other computing systems and/or networking devices. This includes receiving data transmissions from other computing systems and/or networking devices, and also sending data transmissions to other computing systems and/or networking devices. The communication interface(s) 709 can be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The various components of the computing system 700 can be coupled together by one or more buses, which can include a power bus, a control signal bus, a status signal bus, a data bus, etc. For simplicity, the various buses are illustrated in FIG. 7 as a bus system 719.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for efficiently performing application orchestration and management in a hybrid applications environment that comprises both virtualized network functions (VNF) applications and cloud-native network functions (CNF) applications, the method being performed by a unified management and orchestration system, the method comprising:
   receiving an application descriptor that describes features of an application;
   determining, based at least in part on the application descriptor, whether the application should be deployed as a VNF application or as a CNF application;
   when the application descriptor indicates that the application should be deployed as the VNF application:
      determining whether available VNF infrastructure is sufficient to deploy the application as the VNF application;
      building additional VNF infrastructure when it is determined that the available VNF infrastructure is not sufficient to deploy the application as the VNF application; and
      instantiating, with the unified management and orchestration system, the VNF application at least partly on the additional VNF infrastructure; and
   when the application descriptor indicates that the application should be deployed as the CNF application:
      determining whether available CNF infrastructure is sufficient to deploy the application as the CNF application;
      building additional CNF infrastructure when it is determined that the available CNF infrastructure is not sufficient to deploy the application as the CNF application; and
      instantiating, with the unified management and orchestration system, the CNF application at least partly on the additional CNF infrastructure.

2. The method of claim 1, wherein determining whether the application should be deployed as the VNF application or as the CNF application comprises determining whether the application descriptor comprises a VNF descriptor (VNFD) or a Helm chart.

3. The method of claim 2, wherein it is determined that the application should be deployed as the VNF application when the application descriptor comprises the VNFD.

4. The method of claim 2, wherein it is determined that the application should be deployed as the CNF application when the application descriptor comprises the Helm chart.

5. The method of claim 1, wherein:
   the unified management and orchestration system is part of a cloud computing system;
   the cloud computing system comprises cloud infrastructure; and
   determining whether the available VNF infrastructure is sufficient to deploy the application as the VNF application comprises determining whether the cloud infrastructure comprises enough computing resources to deploy the application as the VNF application.

6. The method of claim 1, wherein building the additional VNF infrastructure comprises allocating additional computing resources to the VNF applications.

7. The method of claim 1, wherein building the additional VNF infrastructure comprises terminating at least one other lower priority VNF application.

8. The method of claim 1, wherein:
   the unified management and orchestration system is part of a cloud computing system;
   the cloud computing system comprises cloud infrastructure; and
   determining whether the available CNF infrastructure is sufficient to deploy the application as the CNF application comprises determining whether the cloud infrastructure comprises enough computing resources to deploy the application as the CNF application.

9. The method of claim 1, wherein building the additional CNF infrastructure comprises allocating additional computing resources to the CNF applications.

10. The method of claim 1, wherein building the additional CNF infrastructure comprises terminating at least one other lower priority CNF application.

11. A method for efficiently performing application orchestration and management in a hybrid applications environment that comprises both virtualized network functions (VNF) applications and cloud-native network functions (CNF) applications, the method being performed by a unified management and orchestration system, the method comprising:
  allocating first computing resources for a first portion of a cloud infrastructure that comprises VNF infrastructure;
  causing a plurality of VNF applications to be deployed within the VNF infrastructure;
  allocating second computing resources for a second portion of the cloud infrastructure that comprises CNF infrastructure;
  causing a plurality of CNF applications to be deployed within the CNF infrastructure;
  receiving an application descriptor that describes features of a new application to be deployed;
  when the application descriptor comprises at least one VNF characteristic indicating that the new application should be deployed as a VNF application;
    instantiating a new VNF application when the first computing resources are sufficient to deploy the plurality of VNF applications and the new VNF application; and
    building additional VNF infrastructure when the first computing resources are not sufficient to deploy the plurality of VNF applications and the new VNF application, and instantiating, with the unified management and orchestration system, the new VNF application utilizing at least some of the additional VNF infrastructure; and
  when the application descriptor comprises at least one CNF characteristic indicating that the new application should be deployed as a CNF application;
    instantiating a new CNF application when the second computing resources are sufficient to deploy the plurality of CNF applications and the new CNF application; and
    building additional CNF infrastructure when the first computing resources are not sufficient to deploy the plurality of CNF applications and the new CNF application, and instantiating, with the unified management and orchestration system, the new CNF application utilizing at least some of the additional CNF infrastructure.

12. The method of claim 11, further comprising:
  terminating at least one lower priority VNF application when the application descriptor comprises the at least one VNF characteristic but the first computing resources are not sufficient to deploy the plurality of VNF applications and the new VNF application; and
  terminating at least one lower priority CNF application when the application descriptor comprises the at least one CNF characteristic but the second computing resources are not sufficient to deploy the plurality of CNF applications and the new CNF application.

13. The method of claim 11, wherein the at least one VNF characteristic comprises a VNF descriptor (VNFD).

14. The method of claim 11, wherein the at least one CNF characteristic comprises a Helm chart.

15. A system for efficiently performing application orchestration and management in a hybrid applications environment that comprises both virtualized network functions (VNF) applications and cloud-native network functions (CNF) applications, the system comprising:
  cloud infrastructure comprising a first portion corresponding to VNF infrastructure and a second portion corresponding to CNF infrastructure;
  at least one processor;
  memory communicatively coupled to the at least one processor; and
  instructions stored in the memory, the instructions being executable by the at least one processor to:
    cause a plurality of VNF applications to be deployed within the VNF infrastructure;
    cause a plurality of CNF applications to be deployed within the CNF infrastructure; and
    with a unified management and orchestration system:
      receive an application descriptor that describes features of a new application to be deployed;
      when the application descriptor comprises at least one VNF characteristic indicating that the new application should be deployed as a VNF application; and
        instantiate a new VNF application when available VNF infrastructure is sufficient to deploy the new VNF application along with the plurality of VNF applications; and
        cause additional VNF infrastructure to be build when the available VNF infrastructure is not sufficient to deploy the plurality of VNF applications and the new VNF application, and instantiate the new VNF application on at least some of the additional VNF infrastructure; and
      when the application descriptor comprises at least one CNF characteristic indicating that the new application should be deployed as a CNF application;
        instantiate a new CNF application when available CNF infrastructure is sufficient to deploy the new CNF application along with the plurality of CNF applications; and
        cause additional CNF infrastructure to be built when the available CNF infrastructure is not sufficient to deploy the plurality of CNF applications and the new CNF application, and instantiate the new CNF application on at least some of the additional CNF infrastructure.

16. The system of claim 15, further comprising additional instructions stored in the memory, the additional instructions being executable by the at least one processor to:
  cause at least one lower priority VNF application to be terminated when the application descriptor comprises the at least one VNF characteristic but the available VNF infrastructure is not sufficient to deploy the plurality of VNF applications and the new VNF application; and
  cause at least one lower priority CNF application to be terminated when the application descriptor comprises the at least one CNF characteristic but the available CNF infrastructure is not sufficient to deploy the plurality of CNF applications and the new CNF application.

17. The system of claim 15, wherein the at least one VNF characteristic comprises a VNF descriptor (VNFD).

18. The system of claim 15, wherein the at least one CNF characteristic comprises a Helm chart.

* * * * *